Figure 1:
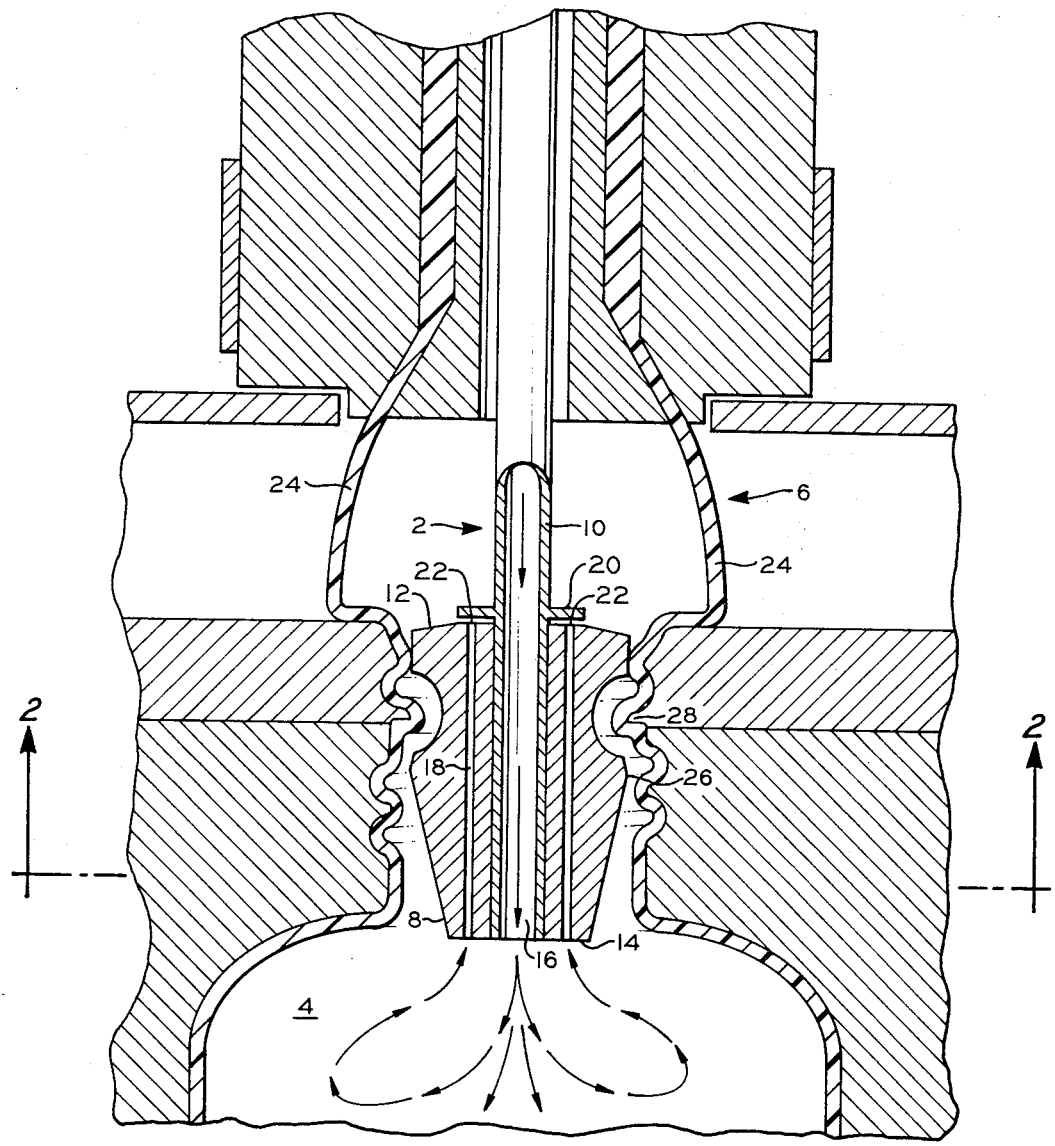

United States Patent [19]
Peters et al.

[11] 3,717,429
[45] Feb. 20, 1973

[54] APPARATUS FOR COOLING THE BLOW PIN AND PLASTIC MOLDING MATERIAL DURING BLOW MOLDING OPERATION

[75] Inventors: Donald L. Peters; Newton R. Wilson, both of Bartlesville, Okla.

[73] Assignee: Phillips Petroleum Company

[22] Filed: Jan. 4, 1971

[21] Appl. No.: 103,377

[52] U.S. Cl. .................................................. 425/387
[51] Int. Cl. .............................................. B29d 23/03
[58] Field of Search ....... 18/5 BA, 5 BM, 5 BE, 5 BN, 18/5 BC, 5 BH, 5 BK, 5 BT; 425/326 B, 387 B

[56] References Cited

UNITED STATES PATENTS

| | | | |
|---|---|---|---|
| 2,930,079 | 3/1960 | Parfrey | 18/5 BA X |
| R25,290 | 12/1962 | Parfrey | 18/5 BA X |
| 3,500,497 | 3/1970 | Culpepper | 18/5 BA |

FOREIGN PATENTS OR APPLICATIONS

| | | | |
|---|---|---|---|
| 670,716 | 4/1952 | Great Britain | 18/5 BA |
| 891,917 | 3/1962 | Great Britain | 18/5 BK |

*Primary Examiner*—J. Spencer Overholser
*Assistant Examiner*—Michael O. Sutton
*Attorney*—Young & Quigg

[57] ABSTRACT

A blow pin of a blow molding apparatus is provided with a central opening and return air passages with a diverter plate adjacent the discharge ends of the return air passages for passing air through the blow pin for blow molding plastic articles and cooling the blow pin and diverting air outwardly for cooling portions of the plastic molding material.

5 Claims, 2 Drawing Figures

PATENTED FEB 20 1973

3,717,429

INVENTORS
D.L. PETERS
N.R. WILSON

BY *Young & Quigg*

ATTORNEYS

APPARATUS FOR COOLING THE BLOW PIN AND PLASTIC MOLDING MATERIAL DURING BLOW MOLDING OPERATION

It is desirable to cool a blow pin of a blow molding apparatus and a portion of the plastic molding material adjacent the mold without cooling the adjacent die head detrimental amounts. By providing for cooling of the blow pin and said portions of the molding material by the method and apparatus of this invention, articles can be blow molded with reduced molded article hang ups, unsightly blobs of molding material adhering to the molded article and with improved shearing of the flash from the molded article.

Other aspects, objects, and advantages of the present invention will become apparent from a study of the disclosure, the appended claims, and the drawing.

The drawings are diagrammatic views of the blow pin of this invention and portions of associated conventional blow molding apparatus.

Figure 2:
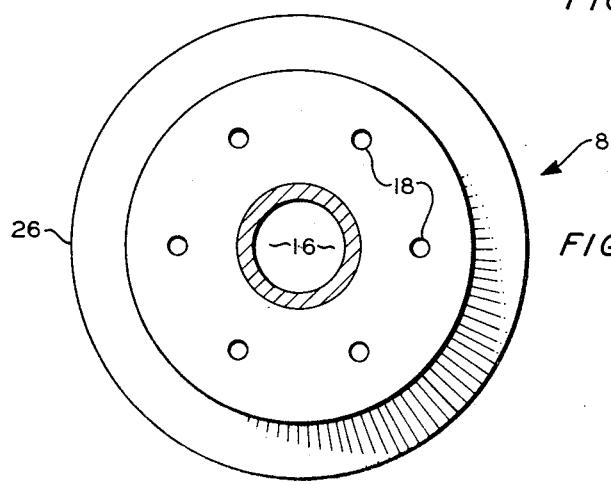

FIG. 1 shows a frontal view in partial section of the blow pin of this invention and a portion of the associated blow molding apparatus; and FIG. 2 shows a view of the blow pin taken along line 2—2 of FIG. 1.

Referring to FIG. 1, a blow pin assembly 2 is mounted on a conventional blow molding apparatus which has a die head, stripper plate, mold shear plate, mold and mold cavity 4 for forming an article of plastic molding material 6 by conventional blow molding methods known in the art. The example mold shown in FIG. 1 is a sectional mold for an article having a relatively small neck area. Closing the mold over the parison prior to blow molding operations thereby forms a compressed portion of molding material as known in the art and referred to as flash.

The blow pin 8 is attached to an air supply source (not shown) by a conduit 10. The blow pin 8 has an axis, first and second ends 12,14 and at least one inlet opening 16 extending longitudinally through the pin 8 opening on the first and second ends 12,14 of the pin 8 in fluid communication with the conduit 10. At least one, preferably a plurality of return air passages 18 are each formed longitudinally through the pin 8 and preferably positioned about the inlet opening 16 thereof with each passage 18 having an outlet end 22 on the first end 12 of the pin 8.

Referring to FIG. 2, in order to provide more uniform cooling of the pin 8 and the adjacent portion of the molding material, it is preferred that the return air passages 18 be positioned about the inlet opening 16 with said passages 18 spaced substantially an equal arcuate distance one from the other. In order to easily provide for sufficient air pressure within the mold cavity for molding the article, it is preferred that the summation of the areas of the return air passage 18 be less than the area of the inlet opening 16 of the blow pin 8. These differences in areas depend upon the clearance between the blow pin and the mold, the volume of the mold cavity, the rate of production, the rate of air flow into the cavity, and the type of molding material employed, but are values that can easily be calculated by one skilled in the art. It is also preferred that the blow pin 8 of this invention be formed of metal to withstand the high temperatures of blow molding of about 250°F and higher for polyolefins, for example, and be a good conductor of heat for cooling by the air streams passing therethrough.

A return air diverting plate 20 is mounted adjacent the first end 12 of the blow pin 8 spaced a distance from the outlet or discharge ends 22 of the return air passages 18 and preferably substantially perpendicular to an axis of each passage 18 for outwardly directing air discharging from said passages 18.

This diverting plate 20 diverts the return air outwardly against the portions 24 of the molding material spaced from the mold for protecting the die head from being detrimentally cooled and initiating setting of portions of the hot molding material. In order to control the stream of air discharging from the passages 18 and more uniformly direct said air streams against the molding material, it is preferred that the distance between the diverting plate 20 and the outlet ends 22 of the passages 18 be in the range of about 0.002–0.006 inch. It has been discovered that at spacings smaller than about 0.002 the space between the diverting plate 20 and the pin 8 sometimes becomes fouled with the plastic molding material and that at spacings larger than about 0.006 inch the air stream is not satisfactorily directed outwardly.

The outer surface of the blow pin 8 can be formed of a configuration such that upward movement of the blow pin 8, near the end of the cycle after the injection of air is terminated, for example, passes a shear area 26 of the blow pin 8 into close proximity with an inwardly extending protrusion 28 of the mold. This movement of the blow pin shears the molding material between the protrusion 28 and the blow pin 8 for forming the neck finish of the molded article.

In the method of this invention the blow pin is inserted within the mold cavity of a conventional blow molding apparatus as known in the art. Air is then passed through the inlet opening of the blow pin and into the mold cavity of the molding apparatus for blow molding plastic materials contained therein. During injection of the air into the mold cavity, air is continuously returned from the mold cavity through separate return air openings through the blow pin for cooling the blow pin. The air discharging from the return air openings is directed outwardly by the diverting plates against portions 24 of the plastic molding material that are spaced from the mold for cooling said portions. The rate of air delivery into the mold cavity is greater than the rate of air delivery discharging from the mold cavity through the blow pin for satisfactorily forming the molded article. The volume of air passing through the blow pin thereby cools the blow pin at least about 10°F, thereby preventing sticking of the blow pin.

EXAMPLE

In an example method of this invention, air at a temperature of 80°F is passed downwardly through the conduit, the blow pin and into the mold cavity at a rate of 0.2 sec./231 in.$^3$. Air from the cavity passes upwardly through the air discharge openings of the blow pin cooling the blow pin about 15°F relative to the temperature of the blow pin without air passing therethrough. The air discharging from the blow pin strikes the diverting plate and flows outwardly into contact with the portion of the molding material spaced from the mold for cooling said portions.

By providing for cooling of the blow pin and portions of the molding material by the method and apparatus of this invention, a more uniform article can be blow molded at a more uniform rate.

Other modifications and alterations of this invention will become apparent to those skilled in the art from the foregoing discussion and accompanying drawing, and it should be understood that this invention is not to be unduly limited thereto.

What is claimed is:

1. A blow pin assembly for a blow molding apparatus having a cavity for blow molding a plastic material therein, comprising;

a blow pin having an axis, a first end, at least one inlet opening extending longitudinally through the pin and at least one return air passage formed longitudinally through the pin and having an outlet end on the first end of the blow pin;

means for outwardly directing all air discharging from said return air passages, said means comprising a return air diverting plate mounted adjacent the first end of the blow pin spaced a distance from and covering the outlet end of the return air passage; and means for passing air through the blow pin inlet opening, into the cavity of the blow molding apparatus, through the air return passage, against the diverting plate and outwardly from the blow pin for cooling the blow pin and portions of the material being blow molded.

2. An apparatus, as set forth in claim 1, wherein the distance between the diverting plate and the outlet end of the return air passage is in the range of about 0.006–0.002 inch.

3. An apparatus, as set forth in claim 1, wherein the summation of the area of the return air passage is less than the area of the inlet opening of the blow pin.

4. An apparatus, as set forth in claim 1, wherein there are a plurality of return air passages positioned about a centrally positioned inlet opening with the return air passages spaced substantially an equal arcuate distance one from the other.

5. An apparatus, as set forth in claim 1, wherein the blow pin is formed of metal.

* * * * *